United States Patent
Wu et al.

(10) Patent No.: US 9,525,860 B2
(45) Date of Patent: Dec. 20, 2016

(54) ENHANCING A SPATIO-TEMPORAL RESOLUTION OF A DEPTH DATA STREAM

(71) Applicant: Xerox Corporation, Norwalk, CT (US)

(72) Inventors: Wencheng Wu, Webster, NY (US); Edgar A. Bernal, Webster, NY (US); Himanshu J. Madhu, Webster, NY (US); Michael C. Mongeon, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 452 days.

(21) Appl. No.: 14/107,534

(22) Filed: Dec. 16, 2013

(65) Prior Publication Data

US 2015/0172623 A1 Jun. 18, 2015

(51) Int. Cl.
*H04N 13/00* (2006.01)
(52) U.S. Cl.
CPC ...... *H04N 13/0029* (2013.01); *H04N 13/0011* (2013.01); *H04N 13/0022* (2013.01); *H04N 2213/003* (2013.01)
(58) Field of Classification Search
USPC ...................... 348/43; 356/634; 600/473, 476
See application file for complete search history.

(56) References Cited

U.S. PATENT DOCUMENTS

2013/0088726 A1* 4/2013 Goyal ................... G01S 7/4866
356/634
2014/0119437 A1* 5/2014 Chen .................... H04N 19/597
375/240.12

OTHER PUBLICATIONS

Bauchert et al., "Advances in liquid crystal spatial light modulators", Society of Photo Instrumentation Engineers, 2002.
Candes, Emmanuel J., "Compressive sampling", Proceedings of the International Congress of Mathematicians, Madrid, Spain, 2006.
Candes et al., "Robust Uncertainty Principles: Exact Signal Reconstruction from Highly Incomplete Frequency Information", Jun. 2004.
Dudley et al., "Emerging Digital Micromirror Device (DMD) Applications", Society of Photo-Optical Instrumentation Engineers, 2003.
In-View Technology Corporation, "CS Camera Technology How a Compressive Sensing Camera Works", 2013.
Jenoptik, "Liquid Crystal Spatial Light Modulators", Aug. 2012.
(Continued)

*Primary Examiner* — Brian Yenke
*Assistant Examiner* — Omer Khalid
(74) *Attorney, Agent, or Firm* — Philip E. Blair; Fleit Gibbons Gutman Bongini & Bianco P.L.

(57) ABSTRACT

What is disclosed is a system and method for enhancing a spatio-temporal resolution of a depth data stream. In one embodiment, time-sequential reflectance frames and time-sequential depth frames of a scene are received. If a temporal resolution of the reflectance frames is greater than the depth frames then a new depth frame is generated based on correlations determined between motion patterns in the sequence of reflectance frames and the sequence of depth frames. The new depth frame is inserted into the sequence of depth frames at a selected time point. If a spatial resolution of the reflectance frames is greater than the depth frames then the spatial resolution of a selected depth frame is enhanced by generating new pixel depth values which are added to the selected depth frame. The spatially enhanced depth frame is then inserted back into the sequence of depth frames.

20 Claims, 8 Drawing Sheets

(56) References Cited

OTHER PUBLICATIONS

Li et al., "Visual attention guided bit allocation in video compression", Image and Vision Computing 29, 2011.
Robucci et al., "Compressive Sensing on a CMOS Separable-Transform Image Sensor", Proceedings on IEEE, Apr. 22, 2009.
Wen et al., "Low Bit-Rate Video Streaming for Face-To-Face Teleconference", Proceedings on IEEE, 2004.
Bernal et al., Reconstructing an Image of a Scene Captured Using a Compressed Sensing Device, U.S. Appl. No. 13/932,791, filed Jul. 1, 2013.
Barron et al., "Intrinsic Scene Properties From a Single RGB-D Image", Computer Vision and Pattern Recognition (CVPR), 2013 IEEE Conference, Jun. 23-28, 2013, pp. 17-24.
Barron et al., "Shape, Albedo, and Illumination from a Single Image of an Unknown Object", Computer Vision and Pattern Recognition (CVPR), 2012 IEEE Conference, Jun. 16-21, 2012, pp. 334-341.
Horn et al., "Determining Optical Flow", Artificial Intelligence Laboratory, Massachusetts Institute of Technology, Apr. 1980.
PO et al., "A Novel Four-Step Search Algorithm for Fast Block Motion Estimation", IEEE Trans. Circuits Syst. Video Technol., vol. 6, No. 3, Jun. 1996, pp. 313-317.
Salvi et al., "A state of the art in structured light patterns for surface profilometry", Pattern Recognition, vol. 43, Issue 8, Aug. 2010, pp. 2666-2680.

\* cited by examiner

US 9,525,860 B2

ENHANCING A SPATIO-TEMPORAL RESOLUTION OF A DEPTH DATA STREAM

TECHNICAL FIELD

The present invention is directed to systems and methods for enhancing a spatio-temporal resolution of time-sequential depth frames of a scene.

BACKGROUND

Frames of depth maps of a scene can be generated by processing depth measurements acquired by a depth sensing device. However, the frames of depth maps are usually generated at a much slower rate than are image frames of a video of that same scene acquired using a video camera. It is sometimes desired to process depth frames generated of a scene so they have a same or similar frame rate (temporal resolution) as that of the video of that scene. Moreover, the spatial resolution of the generated depth maps tends to be smaller than the spatial resolution of the video images of that scene. Therefore, it is desirable to be able to spatially and temporally enhance a sequence of depth frames of a scene.

Accordingly, what is disclosed is a system and method for enhancing a spatio-temporal resolution of time-sequential depth frames of a scene.

BRIEF SUMMARY

What is disclosed is a system and method for enhancing a spatio-temporal resolution of a depth data stream acquired of a scene.

One embodiment of the present method involves the following. Time-sequential reflectance frames of a scene acquired by at least one reflectance sensing device, are received. Time-sequential depth frames of that same scene are also received. One or both of a spatial resolution and a temporal resolution of the time-sequential depth frames and the time-sequential reflectance frames are different. If the temporal resolution of the sequence of reflectance frames is greater than the temporal resolution of the sequence of depth frames then a time point is selected in the sequence of depth frames where a depth frame does not exist. One or more additional depth frames are generated based on correlations determined between motion patterns in the sequence of reflectance frames and in the sequence of depth frames. The additional depth frames are then inserted into the sequence of depth frames at the selected time point to enhance the temporal resolution of the sequence depth frames. If the spatial resolution of the reflectance frames is greater than the spatial resolution of the depth frames then a time point is selected in the sequence of depth frames where a depth frame exists. A spatial resolution of the selected existing depth frame is enhanced based on correlations determined between a distribution of intensity values of pixels of the reflectance frames and a distribution of pixel depth values of the associated depth frames.

Many features and advantages of the above-described system and method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed is a system and method for enhancing a spatio-temporal resolution of time-sequential depth frames of a scene.

Non-Limiting Definitions

A "reflectance sensing device" is a device for acquiring or otherwise obtaining frames of reflectance measurements of a scene. Reflectance measurements of a scene can be obtained by a monochrome camera, a color camera, an infrared camera, a multi-spectral camera, a hyperspectral camera, or a combination thereof.

A "depth sensing device" is a device for acquiring or otherwise obtaining frames of depth measurements of a scene. Depth measurements of a scene can be obtained by an active stereo sensing system, a passive stereo sensing system, or a non-imaging-based depth sensing system such as, for example, a RADAR, a LiDAR, a photo-wave, or a time-of-flight depth sensing system.

Figure 1:
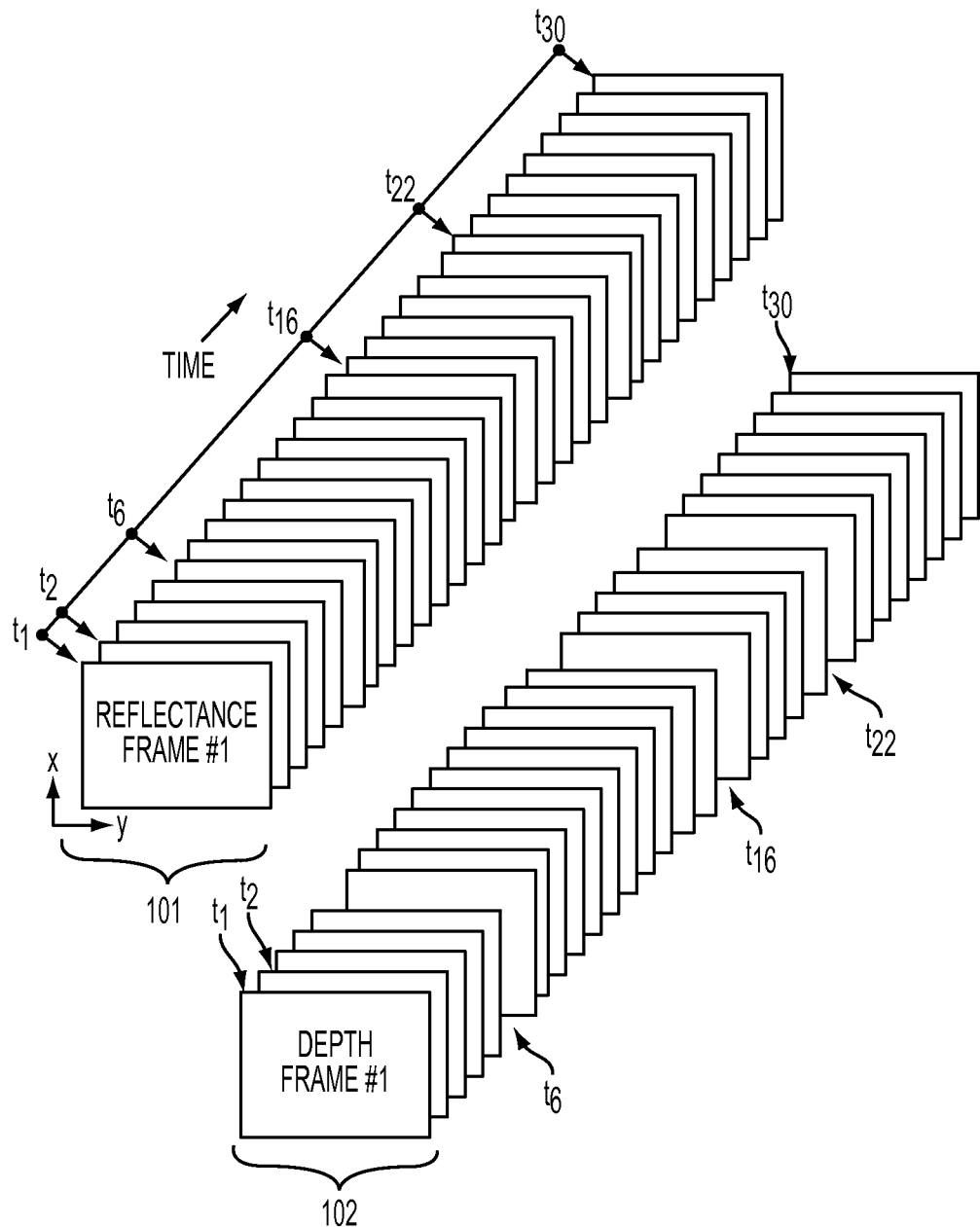
FIG. 1 shows a total of N time-sequential reflectance frames and a plurality of associated time-sequential depth frames.

A "frame" contains pixels (typically a 2D array) with each pixel location in each frame having a value associated therewith which has been sensed or otherwise measured by a sensing device. For example, a color video, as is generally understood, is a sequence of frames of color images captured over a period of time by a video camera. Each pixel in each image of each frame of the video has an associated color value which has been sensed by the photodetector array of the video camera used to acquire those image frames. Color values can be scalar (e.g., one value per pixel, as in a grayscale image) or vectorial (e.g., two or more values per pixel, as in a CMYK or RGB image). The 2D array of pixels forms an image of the scene. Each frame in the video has an associated time point. FIG. 1 shows a total of N time-sequential reflectance frames, collectively at 101, and a plurality of associated time-sequential depth frames, collectively at 102. Each of the reflectance and depth frames has a time point associated therewith. Each reflectance frame of the temporal sequence of reflectance frames 101 comprises reflectance measurements of a scene acquired by at least one reflectance sensing device. Likewise, each depth frame of the temporal sequence of depth frames 102 comprises depth measurements of the same scene acquired by at least one depth sensing device. The spatial resolution and/or the temporal resolution of the sequence of depth frames may be different than that of the sequence of reflectance frames.

The "spatial resolution" of a frame refers to the number of pixels in that frame. For example, assume that the number of pixel intensity values of a reflectance frame is 1200×800, and that the density of pixel depth values in an associated depth frame is 600×400. In this example, the spatial resolution of the sequence of reflectance frames 101 is twice (along each spatial dimension) as great as the spatial resolution of the sequence of depth frames 102.

The "temporal resolution" of a sequence of frames refers to the number of frames in that sequence in a given period of time. In FIG. 1, there are a total of 30 reflectance frames in the sequence of reflectance frames 101 acquired over $t_{30}$ points of time. If each time point represents 1/10 of a second then 30 frames of reflectance measurements were acquired over 3 seconds. Thus, the temporal resolution of the sequence of reflectance frames 101 is 10 frames per second (fps). Since depth frames do not exist at time points $t_6$, $t_{16}$ and $t_{22}$, there are a total of 27 depth frames acquired over 30 seconds. Again, if each time point represents 1/10 of a second, then 27 frames of depth measurements were acquired over 3 second. Thus, the temporal resolution of the sequence of depth frames 102 is equivalent to 27/3=9 fps if the frames were acquired at a constant rate. The temporal resolution of the sequence of reflectance frames 101 is therefore greater than the temporal resolution of the sequence of depth frames 102. Note that in a typical sensing system, reflectance and depth frames may be synchronized and the temporal resolutions may differ by a multiplicative factor (e.g., 10 fps for reflectance sensing and 5 fps for depth sensing, i.e., 2× factor). For such systems, the time points where depth frames do not exist may be spaced in a known, regular fashion, and identification or selection the missing time points to be enhanced is easily performed. For example, in the case of a 2× factor, there will be a missing depth frame (that can be inserted using our proposed method) for every other reflectance frame. Note also that units of temporal measurement other than fps are equally applicable.

An "associated depth frame" in the sequence of depth frames refers to the depth frame which has a time point that is the same or proximate to a time point of a reflectance frame in the sequence of reflectance frames. In FIG. 1, the reflectance frame at time point $t_1$ has an associated depth frame. Likewise, the reflectance at time point $t_2$ has an associated depth frame. The reflectance frames at time points $t_6$, $t_{16}$ and $t_{22}$ do not have associated depth frames because depth frames do not exist at these corresponding time points.

"Enhancing a spatial resolution" means increasing a pixel density in a frame.

"Enhancing a temporal resolution" means increasing the number of frames in a given time period.

A "distribution of pixel intensity values" refers to the ensemble of intensity or color values of pixels in a given neighborhood of pixels in a location within a frame. Formally speaking, let $I(x_0,y_0)$ be the reflectance value of a reflectance frame at pixel location $(x_0,y_0)$ (where indicates $(x_0,y_0)$ pixel row and column coordinates), let $D(x_0,y_0)$ be the depth value of a depth frame at the same pixel location $(x_0,y_0)$ and let $\Omega$ be the set of pixels located near or around pixel location $(x_0,y_0)$, i.e., a neighborhood of pixels for location $(x_0,y_0)$. For illustration purpose, we assume the depth and reflectance pixel are exactly line up at the location $(x_0,y_0)$. It should be appreciated that the depth pixels and reflectance pixels do not need to be exactly lined up. Similarly, a corresponding distribution of pixel intensity values of a depth frame would refer to the ensemble of $D(x,y), \forall (x,y) \in \Omega$. A common example of $\Omega$ is an h×w pixel rectangular window such that $$\Omega = \left\{ (x,y) \mid x \in \left[ x_0 - \frac{w}{2}, x_0 + \frac{w}{2} \right], y \in \left[ y_0 - \frac{h}{2}, y_0 + \frac{h}{2} \right] \right\}.$$

A distribution of pixel intensity values of a reflectance frame refers to the ensemble of $I(x,y), \forall (x,y) \in \Omega$. Since the spatial resolution of the reflectance frame may differ from that of the depth frame, the number of available pixels in $\Omega$ may be different in the two distributions. However, the correspondence between the two distributions can be established simply by spatial proximity. For example, within a given neighborhood $\Omega$, assuming there are more reflectance pixels $N_r$ than depth pixels $N_d$ (e.g., $N_d < N_r$), then $N_d$ reflectance-depth pixel correspondences can be established by the following procedure: For every depth pixel, find a closest reflectance pixel and then use the depth value of the depth pixel and the reflectance value of its closest reflectance pixel to form a reflectance-depth pair. The collected local reflectance-depth pairs can then be further characterized by models to be discussed below and to be used for spatial resolution enhancement or for depth map smoothing. This is achieved by exploiting the correlation or relation between the two distributions. Note that in the case where depth and reflectance frames lie on the same lattice and the spatial resolutions are related by an integer multiplication, the process described will be equivalent to finding the exact corresponding sub-sampled reflectance pixels that align with a depth pixel.

"Correlations" between a distribution of pixel intensity values of reflectance frames and a distribution of pixel depth values of the associated depth frames can be determined using, for instance, a local linear intensity to depth model, a local inverse quadratic intensity to depth model, and a smooth object surface curvature model. That is, the correlations or relations between local reflectance-depth pairs can be approximated by a local linear intensity to depth model, a local inverse quadratic intensity to depth model, or a smooth object surface curvature model. More generally, more models describing the relationship between depth and intensity values can be used. A local linear intensity to depth model is suitable within a neighborhood $\Omega$ if all or most of the pixels within the neighborhood belong to the same object or a smooth surface with near constant color. As an example, the color/reflectance of an object would appear to be darker when moved away from the reflectance sensor since less light (fewer photons) reaches the sensor. It is thus expected that the reflectance value would be somehow inversely proportional to the depth value for an object. The inversely proportional relation can be well approximated by a linear model with negative slope a (a<0), i.e., $I(x,y)=aD(x,y)+b, \forall (x,y) \in \Omega$. Since a scene can comprise many objects with different sizes, a set of local linear models (each with possibly different values for a and b may be needed for each neighborhood) would be required. Although local linear models are good first-order approximations, a more elaborate model based on the radiometry of the illumination source may be desired. In such case, a set of local inverse quadratic intensity to depth model equations, i.e., $$I(x, y) = \frac{a}{D^2(x, y)} + b, \forall (x, y) \in \Omega,$$

is preferred. In practice, these two models may not adequately account for factors such as, for instance, secondary illumination (e.g., casted shadow), non-uniformity of illumination, etc. It is thus desirable to have a more generic model, such as $I(x,y)=f(D(x,y),\forall(x,y)\in\Omega$, where f is a continuous function. Example candidate continuous functions are discussed in: "*Intrinsic Scene Properties from a Single RGB-D Image*", Jonathan T. Barron, Jitendra Malik, UC Berkeley, IEEE Conference on Computer Vision and Pattern Recognition (CVPR), pp. 17-24, (June 2013) which is incorporated herein in its entirety by reference. Candidate continuous functions can also be determined based directly on the data, specifically, the reflectance-depth pairs. Once the correlations/relations between local reflectance-depth pairs are established, they can be used for spatial resolution enhancement and/or smoothing.

"Spatial Resolution Enhancement" can be effectuated using, for example, a local linear intensity to depth model, a local inverse quadratic intensity to depth model, or a smooth object surface curvature model determined from the reflectance-depth pairs of a reference reflectance frame and an existing depth frame. For instance, there may be $N_r > N_d$ reflectance pixels, $N_d$ depth pixels, and $N_d$ reflectance-depth pairs (which can be characterized by a local model) in a neighborhood $\Omega$. Given these data and model, depth values at $N_r - N_d$ pixel locations can be readily estimated at locations where depth values are not available using the correlation and the available reflectance values of pixels at those locations.

"Motion vectors" are derived from a change in a distribution of pixel intensity values between two frames or between a temporal sequence of frames. In one embodiment, motion vectors are derived from a change in a distribution of pixel intensity values between a defined past reflectance frame up to a selected reference reflectance frame in the sequence of reflectance frames. In another embodiment, motion vectors are derived from a change in a distribution of pixel intensity values between a selected reference reflectance frame up to a defined future reflectance frame. Motion vectors define patterns of motion occurring in the scene across successive frames. There are many known methods for deriving motion vectors from two frames. For example, they can be determined by applying a block-based motion estimation method. According to this method, one of the frames is segmented into pixel blocks called target blocks. An estimated or predicted frame is built by stitching together the blocks from the next frame that best matches the target blocks. Motion vectors can be used to describe the relative displacement between the location of the original blocks in the reference frames and their location in the predicted frame. When motion vectors are used for purposes of motion detection, there is no need to create a predicted frame. For another example, they can be determined by applying optical-flow estimation methods between two selected frames. Optical flow is defined as the pattern of apparent motion of objects, surfaces, and edges in a visual scene caused by the relative motion between the observer (e.g., a camera) and the scene. Optical flow may be used for motion detection and image/frame warping purposes. In general, optical flow measures (or estimates) the velocity at which the optical intensity or brightness of an object (or of a pixel) flows through a scene. This can be characterized mathematically as follows: Let $I(x,y,t)$ be the optical intensity of a point in a scene at position $(x,y)$ at time t and let $I(x+\Delta x, y+\Delta y, t+\Delta t)$ be the optical intensity of the same point at a different time $t+\Delta t$. The objective of optical flow estimation is to estimate the velocity of the point $$\left(\frac{\Delta x}{\Delta t}, \frac{\Delta y}{\Delta t}\right)$$

given two reflectance frames $I(x,y,t)$ and $I(x+\Delta x, y+\Delta y, t+\Delta t) \forall (x,y) \in R$ of a scene containing the point in motion. Further, let R represent the set of all positions in the scene. Optical flow estimation usually assumes that the intensity of all the objects/points of interest remains the same within the time period starting at t and ending at $t+\Delta t$. The objective is then to find $(\Delta x, \Delta y)$ such that:

$$I(x,y,t)=I(x+\Delta x, y+\Delta y, t+\Delta t) \qquad (1)$$

Note that in a video stream comprising a set of image frames, or a sequence of image frames, the I in the left-hand side of Eq. (1) is from one frame, while the I in the right-hand side of Eq. (1) is from another frame. This assumption is often referred as the brightness constancy constraint. By applying a Taylor series expansion on $I(x+\Delta x, y+\Delta y, t+\Delta t)$ and using a first-order approximation, the above constraint can be simplified to:

$$\frac{\partial I}{\partial x}\frac{\Delta x}{\Delta t} + \frac{\partial I}{\partial y}\frac{\Delta y}{\Delta t} + \frac{\partial I}{\partial t}\frac{\Delta t}{\Delta t} = 0 \qquad (2)$$

and re-written as:

$$I_x V_x + I_y V_y = -I_t \qquad (3)$$

Here, $I_x$, $I_y$, $I_t$ are the partial derivatives of I along x-, y- and t-axis, respectively. They are known variables that can be estimated directly from the two images in question. $V_x$, $V_y$ are the optical flow values along directions x and y, respectively, that can be estimated using Eq. (3) derived by enforcing the brightness constancy constraint. Note that, while there is only one equation derived from the brightness constancy constraint, there are two unknown values. Thus, the solution is not unique. This is known as the aperture problem. In order to find a unique solution to Eq. (3), (i.e., unique values of the optical flow field), another set of equations is needed. These additional equations can be derived by enforcing additional constraints. Most optical flow methods introduce additional conditions for estimating the actual flow. For example, in some cases it may be assumed that the optical flow within a small region (i.e., a region comprising a certain number of pixels) is constant. In other cases, it may be assumed that optical flow components within a small pixel patch can be approximated by a simple affine model. In using such a model, the optical flow of pixels within a small pixel patch are related by a constant scaling and offset, described by an affine model. Thus, there are numerous ways given a pair of image frames, that one can estimate the optical flow using techniques known in the art. The resulting optical flow field is indicative of the apparent motion of objects, surfaces, and edges in the visual scene as a result of the relative motion between the observer (e.g., a camera) and the scene.

"Temporal resolution enhancement" can be effectuated, for example, by warping an existing frame based on the pixel-wise displacements described by a field of motion vectors; the resulting warped frame is the newly generated frame.

"Frame Warping Using Motion Vectors" describes the process of generating a new frame from an existing frame based on the motion pattern defined by motion vectors. For the purpose of temporal resolution enhancement of depth frames, the motion vectors are derived from corresponding reflectance frames, which are assumed to have higher temporal resolution; the motion vectors are then used to warp an existing depth frame, thus obtaining a newly generated depth frame at a temporal instant where there originally was no measured depth frame. In one embodiment, the warping is done as follows. First, the pixel of an existing depth frame $D(x,y) \forall (x,y) \in R$ is "moved" to a new location $(x+\Delta x, y+\Delta y)$ based on the corresponding motion vector $(\Delta x, \Delta y)$. Here, R represents the scene. The data is then stored into a pixel of a new depth frame $D'(x+\Delta x, y+\Delta y)$ at location $(x+\Delta x, y+\Delta y)$. Repeat this process until all pixels in the existing frame have been moved to their destination location as described by the motion vector field and stored in a new frame. Since motion vectors $(\Delta x, \Delta y)$'s are determined from actual motion of objects in a scene, they may not describe integer displacements, particularly in cases where algorithms with sub-pixel accuracies are used for motion vector computation. As a result, additional processing on the recorded new depth frame may be necessary to generate a typical depth frame with only integer displacements. Note that since $D(x,y)$ is directly sensed by a depth sensor, pixel locations with available data in D are typically evenly distributed in R and the density of data is governed by the spatial resolution of the depth sensor. On the other hand, pixel locations with available data in D' would not be evenly distributed in R when non-stationary motion patterns exist. It is thus necessary to resample D' to construct a new frame which has available data evenly distributed in R with the same density as in D. In the case where there is no motion in the entire scene, the generated depth frame would be identical to the existing frame. This is because during a time interval across which the scene is stationary (as measured by the higher temporal resolution reflectance frames), the depth frames should remain unchanged as well. Other methods can be used to modify an existing depth frame and generate a new depth frame.

"Smoothing" of a newly generated temporal depth frame can be effectuated using, for example, a local linear intensity to depth model, a local inverse quadratic intensity to depth model, or a smooth object surface curvature model determined from the reflectance-depth pairs between a reference reflectance frame and the newly generated depth frame. In the case of smoothing, instead of using depth values generated from temporal resolution enhancement, one would first use said generated depth values for a new depth frame and a corresponding reflectance frame to build the correlations of reflectance-depth pairs, then replace said generated depth values with the depth values predicted based on the correlations and the depth to intensity model. Note that if the correlations are perfect, i.e., no noises, the actual depth values would be the same as the predicted depth values. In the presence of noise, the predicted depth values would typically smoother than the actual depth values since correlations are built via fitting smooth functions between two distributions discussed earlier. This process is thus called smoothing in the context of this invention.

Example System

Figure 2:
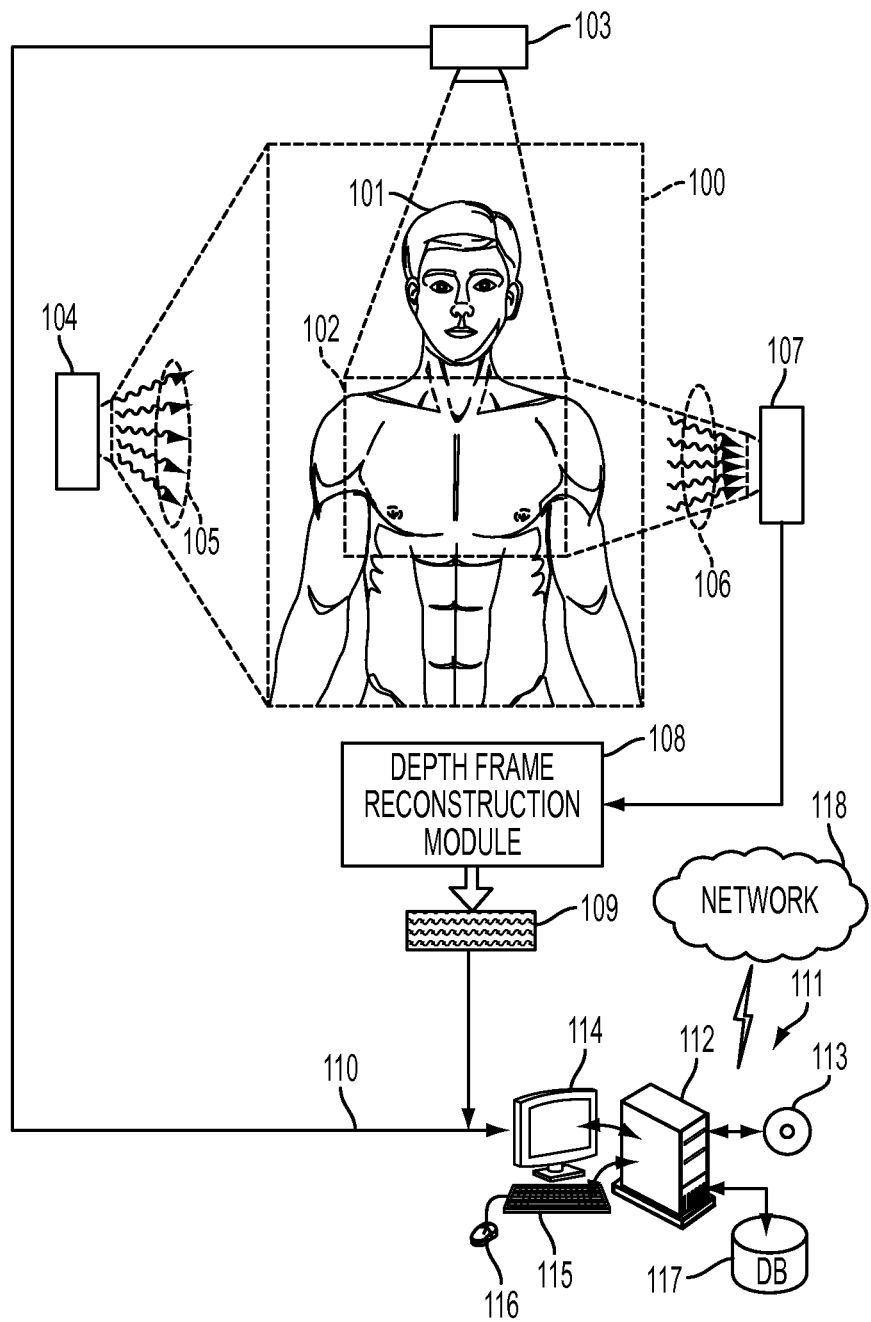
FIG. 2 which illustrates one example system for acquiring time-sequential reflectance frames and time-sequential depth frames of a scene for processing in accordance with the present method.

Reference is now being made to FIG. 2 which illustrates one example system for acquiring time-sequential reflectance frames and time-sequential depth frames of a scene for processing in accordance with the present method. Although this example illustrates the use of a reflectance sensing device and an illuminating device, the method is equally applicable to other imaging-based depth-sensing systems such as passive stereo devices and multi-camera arrays.

In the scene 100 of FIG. 2, subject 101 is shown having frames of measurement data being acquired of the chest area 102. Reflectance sensing device 103 shown comprising a video camera is acquiring a temporal sequence of reflectance frames of the chest area. In this embodiment, illuminator 104 projects a pattern of light 105 with known spatial attributes onto the scene. The pattern of light 106 reflected off the chest area is detected by depth sensing device 107 which is sensitive in a wavelength band overlapping with the wavelength of the light source projected by illuminator 104. Measurements obtained by the depth sensing device 107 are communicated to depth frame reconstruction module 108 which generates, as output, a temporal sequence of depth frames 109. The spatial and/or temporal resolution of the sequence of depth frames generated as output by module 108 is less than that of the sequence of reflectance frames 110 obtained by video camera 103. The time-sequential reflectance frames and the time-sequential depth frames generated by the system of FIG. 2 are received by a workstation 111.

Workstation 111 has a computer case 112 which houses a motherboard with a processor and memory, a communications link such as a network card, graphics card, and the like. The workstation has hardware which reads/writes to a computer readable media 113 such as a floppy disk, CD-ROM, DVD, USB-Drive, etc. The workstation further includes a display device 114 such as a CRT, LCD, touch screen, etc., a keyboard 115 and a mouse 116. The workstation has a storage device 117 where the received frames may be stored. The workstation is placed in communication with one or more remote devices over a network 118, which may comprise a wired or wireless connection.

It should be appreciated that the workstation has an operating system and other specialized software configured to display a wide variety of numeric values, text, scroll bars, pull-down menus with user selectable options, and the like, for entering, selecting, or modifying information displayed on the display device. The embodiment shown is only illustrative. Although shown as a desktop computer, it should be appreciated that the workstation can be a smartphone, laptop, mainframe, client/server, or a special purpose computer such as an ASIC, circuit board, dedicated processor, or the like.

Flow Diagram of One Embodiment

Figure 3:
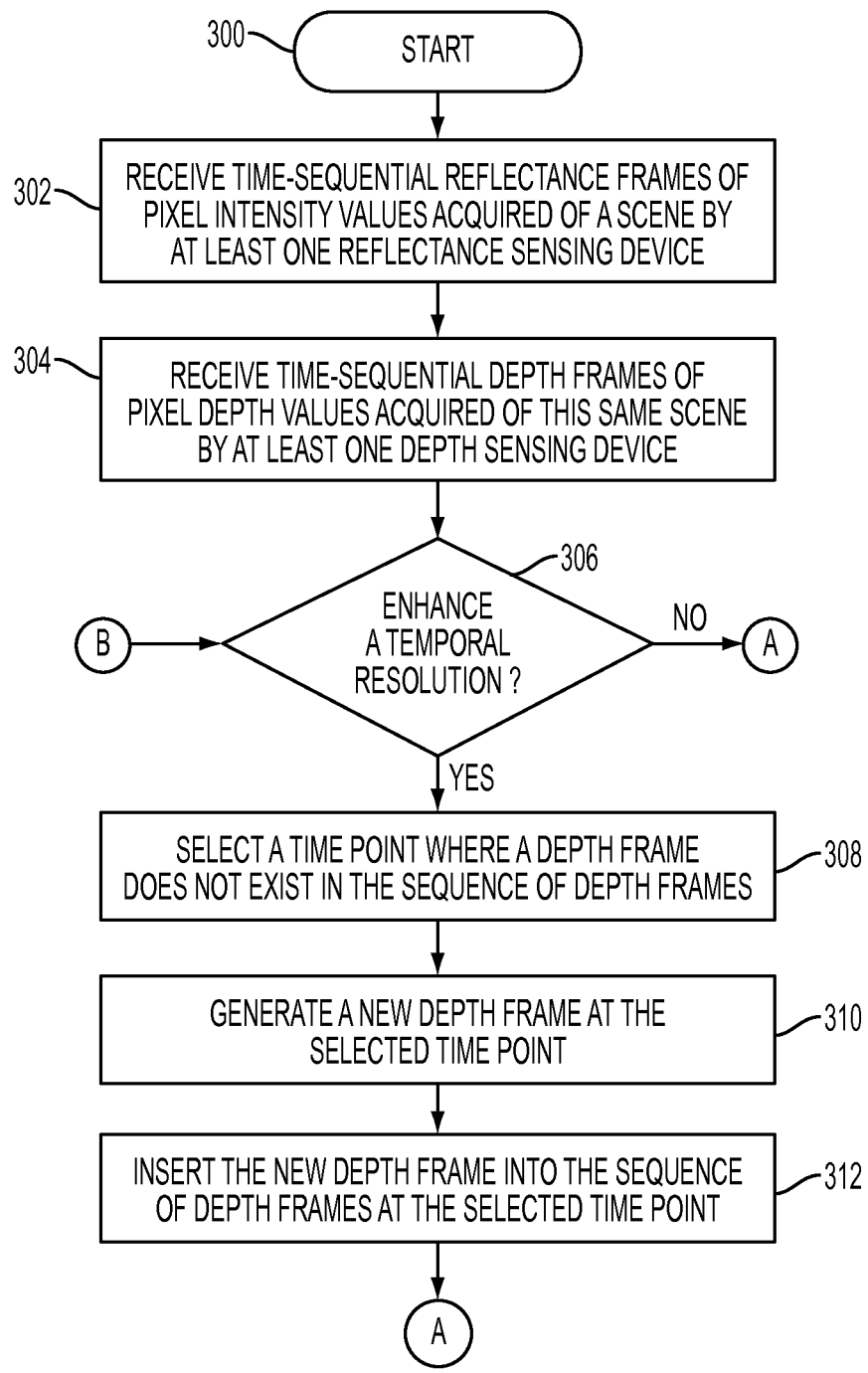
FIG. 3 which illustrates one example embodiment of the present method for enhancing a spatio-temporal resolution of time-sequential depth frames acquired of a scene by the system of FIG. 2.

Reference is now being made to the flow diagram of FIG. 3 which illustrates one example embodiment of the present method for enhancing a spatio-temporal resolution of time-sequential depth frames acquired of a scene by the system of FIG. 2. Flow processing starts at step 300 and immediately proceeds to step 302.

At step 302, receive time-sequential reflectance frames of pixel intensity values acquired of a scene by at least one reflectance sensing device.

At step 304, receive time-sequential depth frames of pixel depth values of the scene captured by at least one depth sensing device.

At step 306, a determination is made whether to enhance a temporal resolution of the received depth frames. If not, then flow continues with respect to node A. Otherwise, flow continues with respect to step 308.

At step 308, select a time point in the sequence of depth frames where a depth frame does not exist. Examples where depth frames do not exist are shown in FIG. 1 at time points $t_6$, $t_{16}$ and $t_{22}$. Assume for discussion purposes that the selected time point is $t_6$.

At step 310, generate a new depth frame for the selected time point. In one embodiment, a new depth frame is constructed by selecting a reference reflectance frame from the sequence of reflectance frames that is temporally closest to the selected time point, and then either (1) forwardly constructing the new depth frame utilizing at least one past depth frame relative to the selected time point and motion vectors derived from a change in a distribution of pixel intensity values between a past reflectance frame up to the selected reference reflectance frame, or (2) backwardly constructing the new depth frame utilizing at least one future depth frame relative to the selected time point and motion vectors derived from a change in a distribution of pixel intensity values between the selected reference reflectance frame up to a future reflectance frame; or (3) constructing the new depth frame by combining a result of the forward and backward constructions; in all three cases, the construction of a new depth frame is performed as disclosed earlier in the document. Additionally/optionally, a smoothing process may be performed to said new depth frame based on the distribution of pixel intensity values of said selected reference reflectance frame. In one embodiment, the distribution of pixel intensity is characterized by a local linear intensity to depth model. Other embodiments utilizing different models as disclosed above can alternatively be used for purposes of smoothing.

Figure 5:
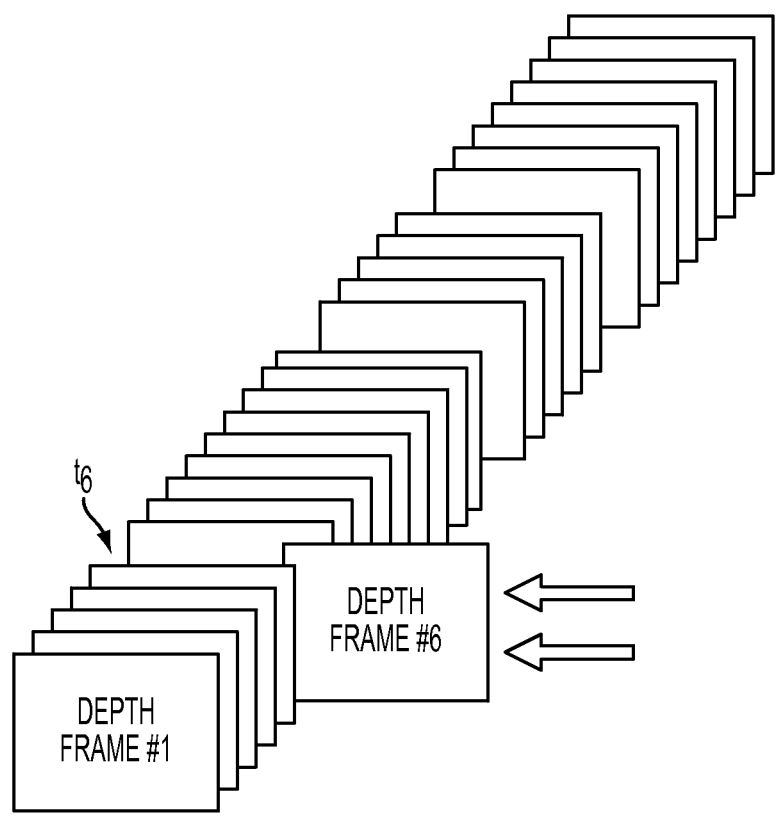
FIG. 5 shows new depth frame being inserted into the sequence of depth frames of FIG. 1 at the selected time point $t_6$ to generate a temporally enhanced sequence of depth frames.

At step 312, insert the new depth frame into the sequence of depth frames at the selected time point. For example, if the selected time point was $t_6$ where a depth frame does not exist, then the new depth frame would be inserted into the sequence of depth frames at this time point. FIG. 5 shows new depth frame being inserted into the sequence of depth frames at the selected time point.

Figure 4:
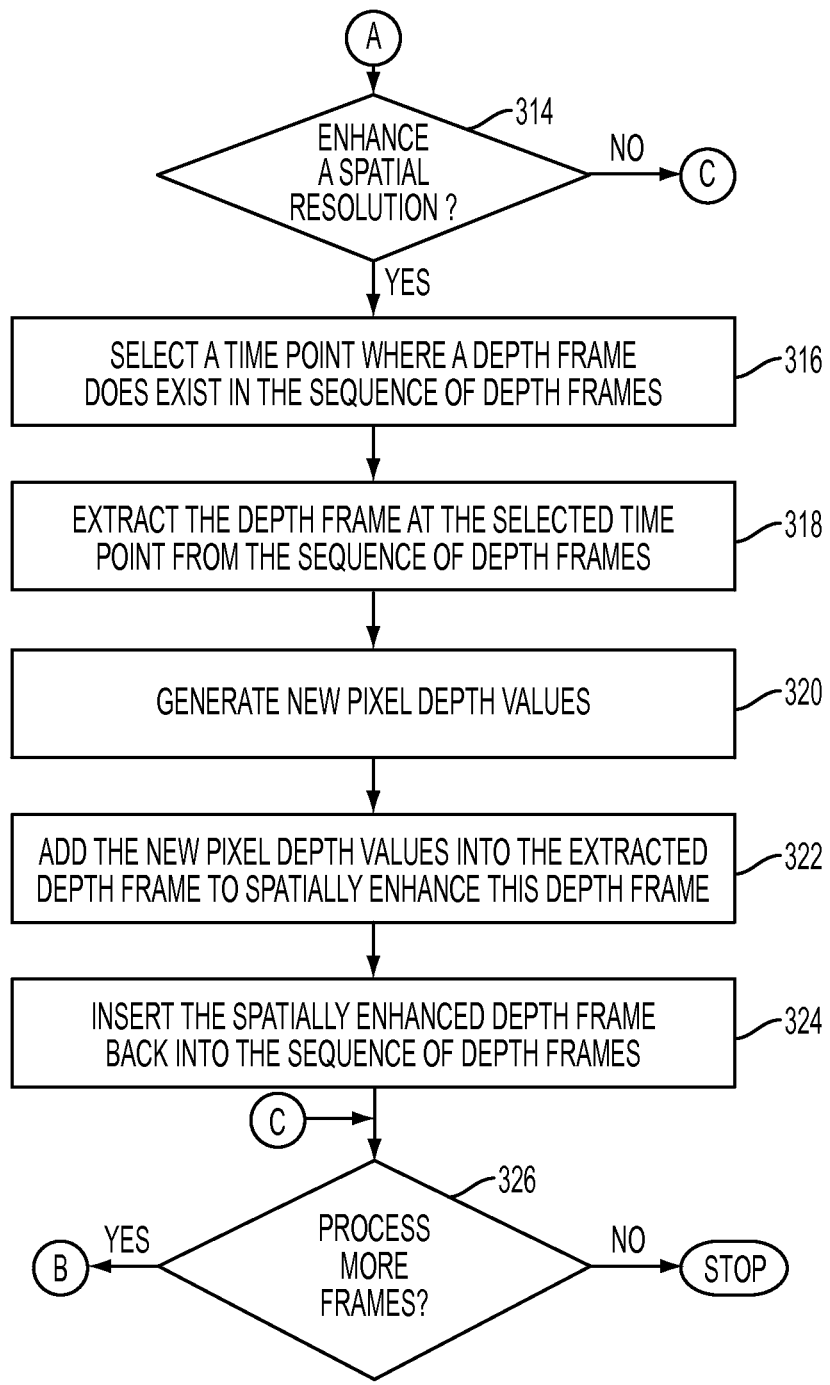
FIG. 4 is a continuation of the flow diagram of FIG. 3 with flow processing continuing with respect to node A.

Reference is now being made to FIG. 4 which is a continuation of the flow diagram of FIG. 3 with flow processing continuing with respect to node A.

At step 314, a determination is made whether to enhance a spatial resolution of any of the received depth frames. If not then flow continues with respect to node C.

At step 316, select a time point where a depth frame does exist in the sequence of depth frames. Assume for discussion purposes that the selected time point is $t_2$.

Figure 6:
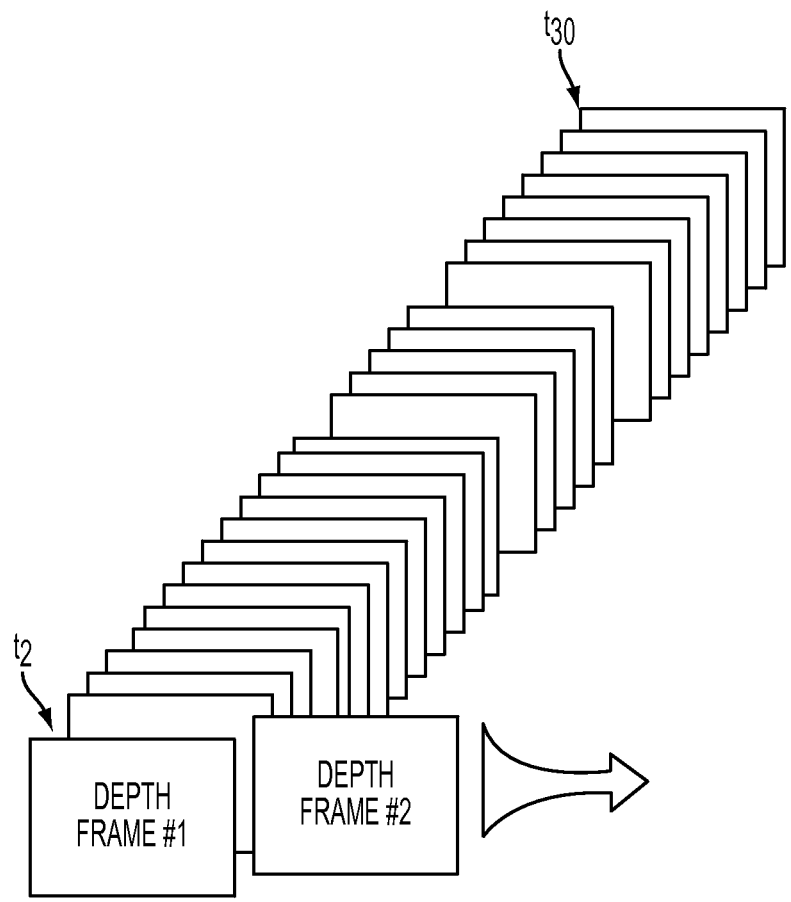
FIG. 6 shows a depth frame at the selected time point $t_2$ being extracted into the sequence of depth frames of FIG. 5 for spatial enhancement.

At step 318, extract the depth frame which exists at the selected time point. FIG. 6 shows the depth frame at time point $t_2$ being extracted from the temporally enhanced sequence of depth frames of FIG. 5.

At step 320, generate new pixel depth values. In one embodiment, spatial resolution is enhanced by selecting a reference reflectance frame from the sequence of reflectance frames which is temporally proximate to the selected time point, generating new pixel depth values by interpolating depth values of the existing depth frame based on the distribution of pixel intensity values of the selected reference reflectance frame, and inserting the new pixel depth values into the existing depth frame.

At step 322, add the new pixel depth values into the extracted depth frame to spatially enhance this depth frame.

Figure 7:
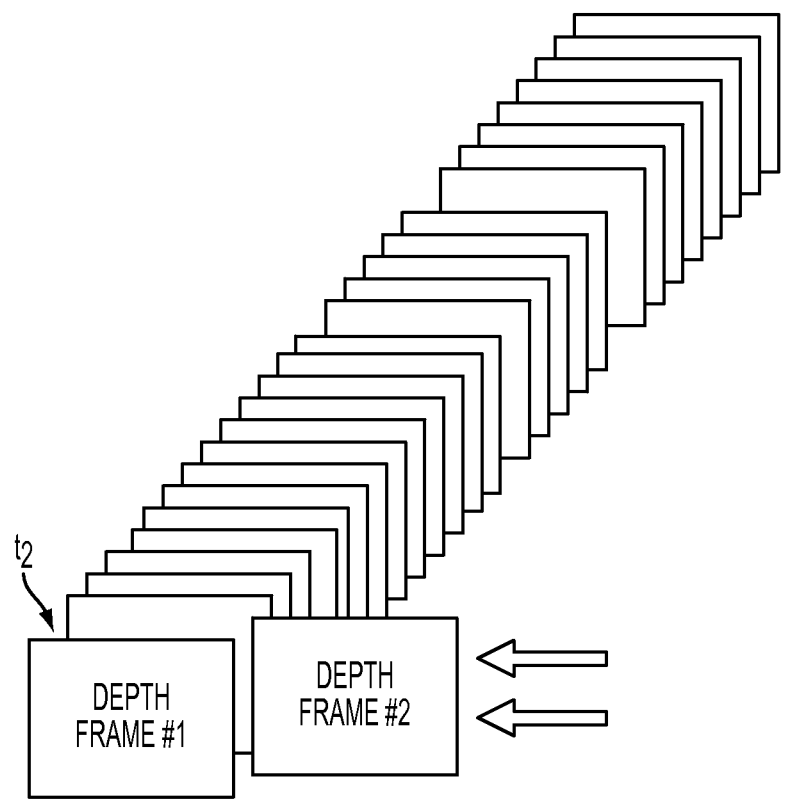
FIG. 7 shows the spatially enhanced depth frame extracted in FIG. 6 being inserted back into the temporally enhanced sequence of depth frames of FIG. 5.

At step 324 insert the spatially enhanced depth frame back into the sequence of depth frames. FIG. 7 shows the spatially enhanced depth frame being inserted back into the temporal sequence of FIG. 5.

At step 326, a determination is made whether additional processing is desired. If so, then processing continues with respect to node B wherein, at step 306, another determination is made whether to further enhance a temporal resolution of the sequence of depth frames. Processing repeats in a similar manner until, at step 326, no further additional processing is desired. Thereafter, in this embodiment, further processing stops.

It should be understood that the flow diagrams hereof are illustrative. One or more of the operations may be performed in a differing order. In particular, the order in which the temporal and spatial enhancement operations take place may vary. Other operations may be added, modified, enhanced, or consolidated. Variations thereof are intended to fall within the scope of the appended claims. All or portions of the flow diagrams may be implemented partially or fully in hardware in conjunction with machine executable program instructions.

Block Diagram of Processing System

Figure 8:
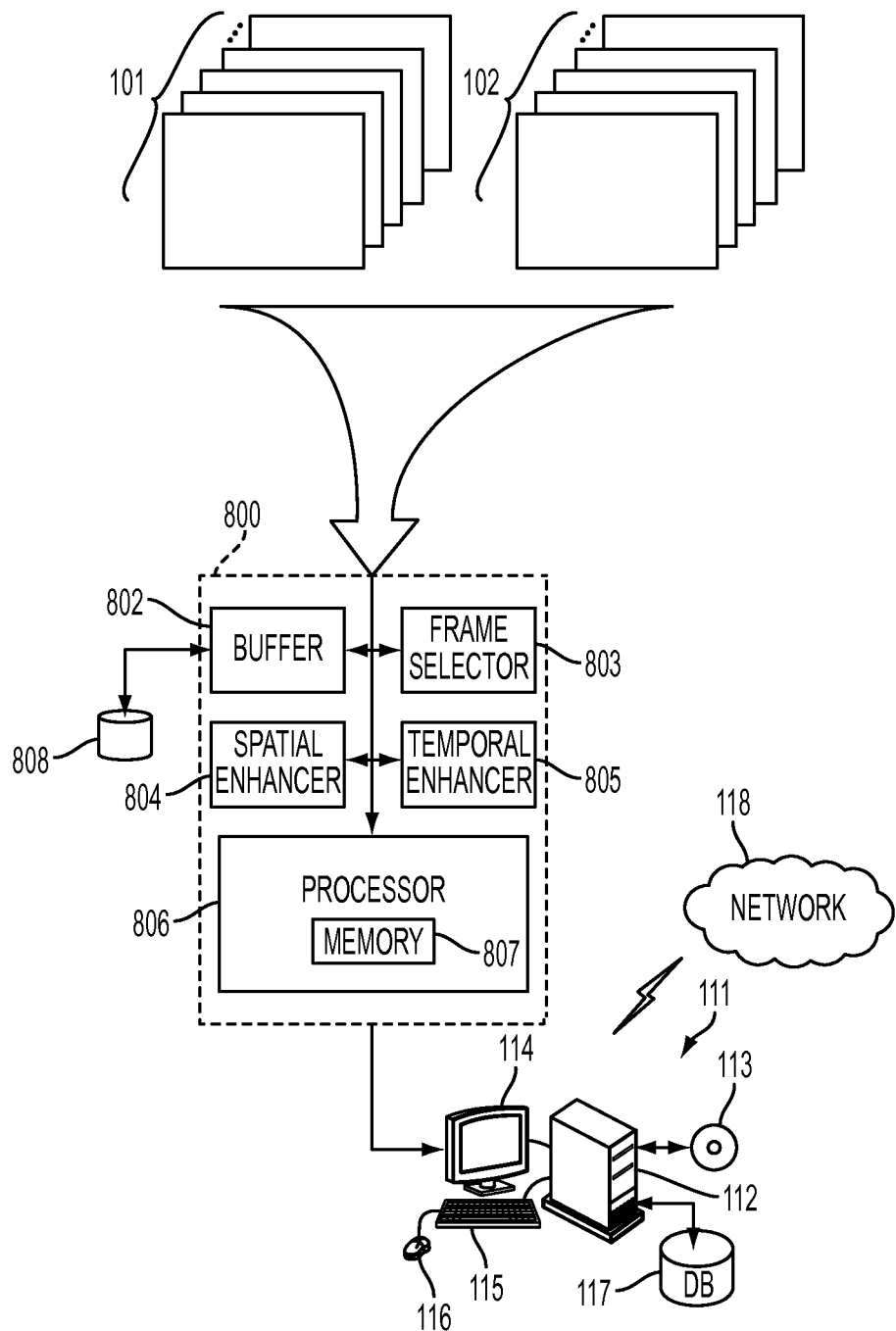
FIG. 8 which shows a block diagram of an example system for performing various aspects of the teachings hereof as described with respect to the flow diagrams of FIGS. 3 and 4.

Reference is now being made to FIG. 8 which shows a block diagram of an example system for performing various aspects of the teachings hereof as described with respect to the flow diagrams of FIGS. 3 and 4.

In FIG. 8, frame processing system 800 receives sequences of frames 101 and 102 into Buffer 802 which may be further configured to also store data, mathematical formulas and other representations to facilitate processing of the image in accordance with the teachings hereof. Such data can be stored to storage media 808. Frame Selector Module 803 enables the selection of one or more time points in the received sequence of frames. Spatial Enhancer Module 804 and Temporal Enhancer Module 805 effectuate a spatial and temporal enhancement, respectively, of the received sequence of depth frames, in accordance with the teachings hereof. Processor 806 and Memory 807 are shown to support the processing requirements of any of the modules and processing units of system 800. The frame processing system 800 is shown in communication with the workstation of FIG. 1.

Each module of the processing system 800 may have a specialized processor executing machine readable program instructions for performing their intended functions. A module may comprise an ASIC, an electronic circuit, a special purpose processor, and the like. A plurality of modules may be executed by a single special purpose computer system or a plurality of computer systems operating in parallel. Modules may include software/hardware which may further comprise an operating system, drivers, controllers, and other apparatuses some or all of which may be connected via a network. Various modules may designate one or more components. A plurality of modules may collectively perform a single function.

Various aspects of the systems and methods described herein are intended to be incorporated in an article of manufacture which may be shipped, sold, leased, or otherwise provided separately either alone or as part of a product suite. The above-disclosed features and functions or alternatives thereof, may be combined into other systems and applications. Presently unforeseen or unanticipated alternatives, modifications, variations, or improvements may become apparent and/or subsequently made by those skilled in the art and, further, may be desirably combined into other different systems or applications. Changes to the above-described embodiments may be made without departing from the spirit and scope of the invention. The teachings of any printed publications including patents and patent applications, are each separately hereby incorporated by reference in their entirety.

What is claimed is:

1. A method for enhancing a spatio-temporal resolution of time-sequential depth frames of a scene, the method comprising:
receiving time-sequential reflectance frames of pixel intensity values acquired of a scene by at least one reflectance sensing device;
receiving time-sequential depth frames of pixel depth values of said scene acquired by at least one depth sensing device; and
performing at least one of:
(A) in response to a temporal resolution of said reflectance frames being greater than a temporal resolution of said depth frames,
selecting a time point where a depth frame does not exist in said sequence of depth frames;
constructing at least one new depth frame based on correlations determined between motion patterns in said sequence of reflectance frames and said sequence of depth frames; and
inserting said new depth frame into said sequence of depth frames at said selected time point; and
(B) in response to a spatial resolution of said reflectance frames being greater than a spatial resolution of said depth frames,
selecting a time point where a depth frame does exist in said sequence of depth frames; and
enhancing a spatial resolution of said existing depth frame at said selected time point based on correlations determined between a distribution of pixel intensity values of said reflectance frames and a distribution of pixel depth values of said associated depth frames.

2. The method of claim 1, wherein enhancing a temporal resolution of said sequence of depth frames at said selected time point comprises:
selecting a reference reflectance frame from said sequence of reflectance frames that is temporally closest to said selected time point; and
performing any of:
(a) forwardly constructing said new depth frame utilizing at least one past depth frame relative to said selected time point and motion vectors derived from a change in a distribution of pixel intensity values between a past reflectance frame up to said selected reference reflectance frame;
(b) backwardly constructing said new depth frame utilizing at least one future depth frame relative to said selected time point and motion vectors derived from a change in a distribution of pixel intensity values between said selected reference reflectance frame up to a future reflectance frame; and
(c) constructing said new depth frame by combining a result of said forward and backward constructions.

3. The method of claim 2, wherein, in advance of inserting said new depth frame into said sequence of depth frames at said selected time point, further comprising smoothing pixel depth values of said new depth frame based on correlations determined between said distribution of pixel intensity values of said selected reference reflectance frame and the distribution of pixel intensity values of said new depth frame.

4. The method of claim 3, wherein said correlations determined between said two distributions of pixel intensity values are characterized using any of: a local linear intensity to depth model, a local inverse quadratic intensity to depth model, and a smooth object surface curvature model.

5. The method of claim 2, wherein said motion vectors are derived using any of: an optical flow method, a block-matching motion estimation method, a feature matching method, and an object matching method.

6. The method of claim 1, wherein enhancing a spatial resolution of said sequence of depth frames comprises:
selecting a reference reflectance frame from said sequence of reflectance frames which is temporally proximate to said selected time point;
generating new pixel depth values by interpolating depth values of said existing depth frame based on correlations determined between said distribution of pixel intensity values of said selected reference reflectance frame and the distribution of pixel intensity values of said existing depth frame; and
inserting said new pixel depth values into said existing depth frame.

7. The method of claim 6, wherein said correlations determined between said two distributions of pixel intensity values are characterized using any of: a local linear intensity to depth model, a local inverse quadratic intensity to depth model, and a smooth object surface curvature model.

8. The method of claim 1, wherein said reflectance sensing device comprises any of: a monochrome camera, a color camera, an infrared camera, a multi-spectral camera, a hyperspectral camera, and a combination thereof.

9. The method of claim 1, wherein said depth sensing system is one of: an active stereo imaging system, a passive stereo imaging system, and a non-imaging-based depth sensing system.

10. The method of claim 9, wherein said non-imaging-based depth sensing system comprises any of: a RADAR device, a LiDAR device, a photo-wave device, and a time-of-flight depth measuring device.

11. A system for enhancing a spatio-temporal resolution of time-sequential depth frames of a scene, the system comprising:
a memory and a storage device; and
a processor in communication with said memory and storage device, said processor executing non-transitory machine readable program instructions for:
receiving time-sequential reflectance frames of pixel intensity values of a scene acquired by at least one reflectance sensing device;
receiving time-sequential depth frames of pixel depth values of said scene
acquired by at least one depth sensing device; and
performing at least one of:
(A) in response to a temporal resolution of said reflectance frames being greater than a temporal resolution of said depth frames, selecting a time point where a depth frame does not exist in said sequence of depth frames;
constructing at least one new depth frame based on correlations determined between motion patterns in said sequence of reflectance frames and said sequence of depth frames; and
inserting said new depth frame into said sequence of depth frames at said selected time point; and
(B) in response to a spatial resolution of said reflectance frames being greater than a spatial resolution of said depth frames, selecting a time point where a depth frame does exist in said sequence of depth frames; and enhancing a spatial resolution of said existing depth frame at said selected time point based on correlations determined between a distribution of pixel intensity values of said reflectance frames and a distribution of pixel depth values of said associated depth frames.

12. The system of claim 11, wherein enhancing a temporal resolution of said sequence of depth frames at said selected time point comprises:
  selecting a reference reflectance frame from said sequence of reflectance frames that is temporally closest to said selected time point; and
  performing any of:
  (a) forwardly constructing said new depth frame utilizing at least one past depth frame relative to said selected time point and motion vectors derived from a change in a distribution of pixel intensity values between a past reflectance frame up to said selected reference reflectance frame;
  (b) backwardly constructing said new depth frame utilizing at least one future depth frame relative to said selected time point and motion vectors derived from a change in a distribution of pixel intensity values between said selected reference reflectance frame up to a future reflectance frame; and
  (c) constructing said new depth frame by combining a result of said forward and backward constructions.

13. The system of claim 12, wherein, in advance of inserting said new depth frame into said sequence of depth frames at said selected time point, further comprising smoothing pixel depth values of said new depth frame based on correlations determined between said distribution of pixel intensity values of said selected reference reflectance frame and the distribution of pixel intensity values of said new depth frame.

14. The system of claim 13, wherein said correlations determined between said two distributions of pixel intensity values are characterized using any of: a local linear intensity to depth model, a local inverse quadratic intensity to depth model, and a smooth object surface curvature model.

15. The system of claim 12, wherein said motion vectors are derived using any of: an optical flow method, a block-matching motion estimation method, a feature matching method, and an object matching method.

16. The system of claim 11, wherein enhancing a spatial resolution of said sequence of depth frames comprises:
  selecting a reference reflectance frame from said sequence of reflectance frames which is temporally proximate to said selected time point;
  generating new pixel depth values by interpolating depth values of said existing depth frame based on correlations determined between said distribution of pixel intensity values of said selected reference reflectance frame and the distribution of pixel intensity values of said existing depth frame; and
  inserting said new pixel depth values into said existing depth frame.

17. The system of claim 16, wherein said correlations determined between said two distributions of pixel intensity values are characterized using any of: a local linear intensity to depth model, a local inverse quadratic intensity to depth model, and a smooth object surface curvature model.

18. The system of claim 11, wherein said reflectance sensing device comprises any of: a monochrome camera, a color camera, an infrared camera, a multi-spectral camera, a hyperspectral camera, and a combination thereof.

19. The system of claim 11, wherein said depth sensing system is one of: an active stereo imaging system, a passive stereo imaging system, and a non-imaging-based depth sensing system.

20. The system of claim 19, wherein said non-imaging-based depth sensing system comprises any of: a RADAR device, a LiDAR device, a photo-wave device, and a time-of-flight depth measuring device.

\* \* \* \* \*